May 26, 1953  M. MORRISON  2,640,175
TIME KEEPING DEVICE MOTOR
Filed Aug. 5, 1949
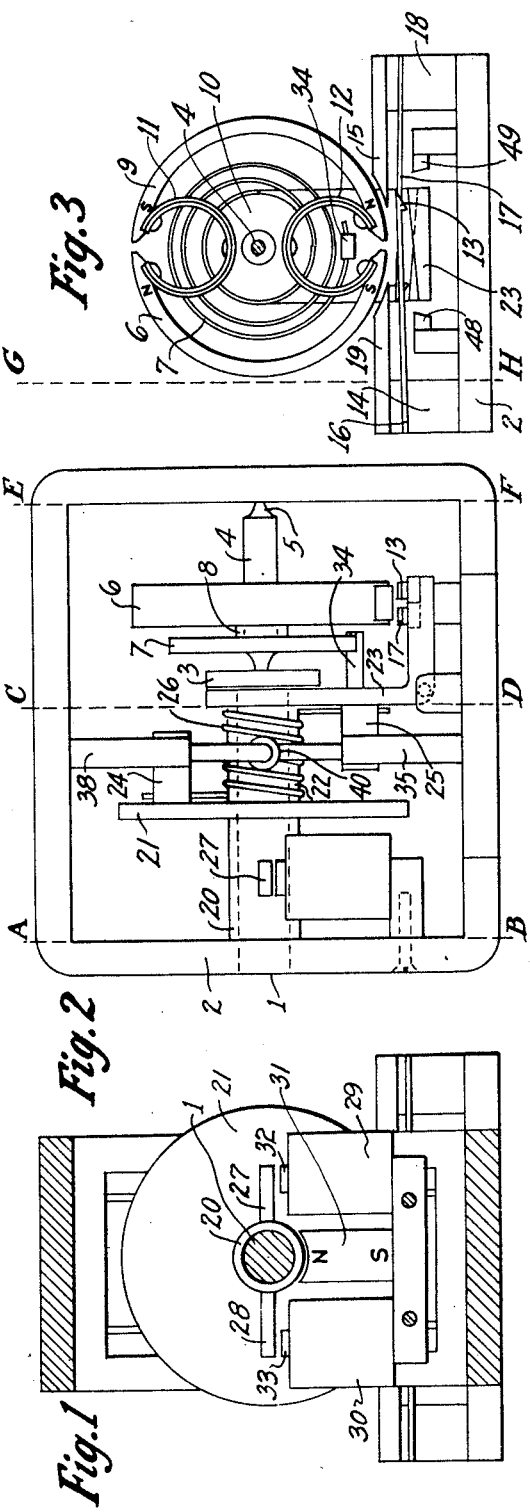
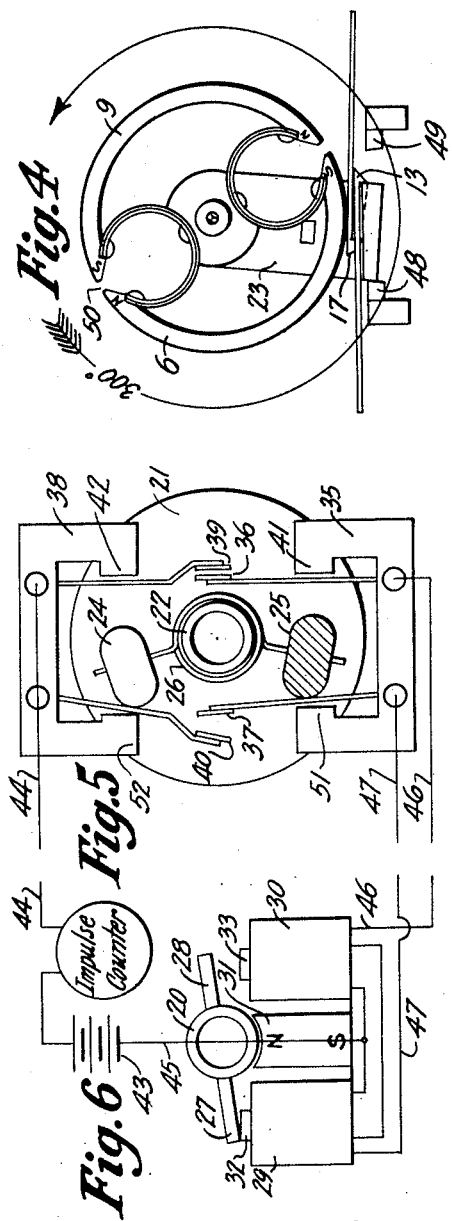
Inventor
Munford Morrison

UNITED STATES PATENT OFFICE 2,640,175

TIME KEEPING DEVICE MOTOR

Montford Morrison, Upper Montclair, N. J.

Application August 5, 1949, Serial No. 108,679

8 Claims. (Cl. 318—131)

The present invention relates to time-keeping mechanisms and systems, it relates in particular to the class of time-pieces employing balance-wheel and hair-spring combinations and specifically it relates to clocks operated by direct current.

An object of the invention is to provide in any class time-keeping systems employing a balance-wheel and hair-spring combination driven by an impulse system subject to variations in impulse strength, an impulse stabilizer between the primary impulse system and the balance-wheel, to reduce variations in the strength of the impulses received from the primary system before applying these impulses to the balance-wheel.

Another object of the invention is to drive the balance-wheel through the hair-spring connection thereto, thereby freeing the balance-wheel of pallet couplings and of percussive devices, both of which are frequent sources of time-keeping faults.

Another object of the invention is to provide a regulation which is magnetically operated by the balance-wheel without any mechanical connections thereto, thereby taking a minimum amount of power from the balance-wheel-hair-spring system to operate the escapement.

Another and more generalized object is to provide in a time-keeping device a balance-wheel-hair-spring system that is entirely mechanically free, except for the necessary balance-wheel bearings and a hair-spring connection.

Another object of the invention is to provide a method and means to adjust the rate of going of a time-piece, employing a balance-wheel-hair-spring structure driven by a primary impulse system, by employing an adjustable secondary impulse system to regulate the strength of the impulses imparted to the balance-wheel.

The nature of the invention resides in a generic class of novel structures employing any form of balance-wheel and hair-spring structure or employing the equivalent thereof. It being definitely understood that any equivalent of a hair-spring is hereby stated to come within the meaning of this disclosure. The applicant has specifically in view, a balance-wheel operating in a permanent magnetic field, which is the equivalent of a hair-spring and a full disclosure of which will form the invention in a separate application.

The generic nature of the invention may be applied to spring driven watches, clocks and related devices, but it has particular application to direct current driven clocks such as for instance, "self winding" clocks and in more particularity to "automobile" clocks.

It is believed that the generic nature of the invention can be fully understood by those skilled in the art of time-piece making, by disclosing an embodiment in a direct current operated clock.

Broadly it is immaterial to the nature of the invention, what constitutes the source of the motive power for the impulses, whether this be a spring-motor or an electric-motor.

The embodiment described hereunder employs as a source of power, for driving the time-keeping structure, an electromotive device in the form of a polarized electromagnet, for simplicity and clearness of description.

Structurally the nature of the invention resides in what may be described as a spring-impulsed cockable hammer with a trigger release, interposed between a source of primary impulses and a balance-wheel system, the primary impulses serving to cock the hammer and the spring of the hammer imparting the impulse energy to the balance-wheel system on being released by the balance-wheel operation of the trigger. In such a structure the blow of the hammer is independent of any superfluous amount of energy which may have been used in cocking it.

A further structural nature of the invention resides instead of fixing the one end of the balance-wheel hair-spring to a verge bearing-plate, one end thereof is fixed to a balance-wheel impulsing member, so that the balance wheel is impulsed through the hair-spring, thereby eliminating pallet couplings and percussive impulse structures, resulting in a structure that is mechanically free of such encumbrances, which impair time-keeping qualities of time-pieces.

A further structural nature of the invention resides in the use of a magnetic field to cause the release in the escapement employed, thereby eliminating all mechanical friction between the balance wheel and the escapement mechanism, reducing greatly the amount of energy taken from the balance-wheel-hair-spring (or its equivalent) system. The only energy loss taken from the balance-wheel system is that of actually raising the escapement latch and the infinitesimal magnetic losses in the latches (hysteresis and eddy current losses).

A good practical view of the prior art pertinent theory can be gained from the April 4, 1922, issue of the Journal of the Washington Academy of Sciences in the article "Some precision pendulums," by Walter P. White; in the same journal, December 1938 issue, "Time measurements," by Frank Wenner.

It is pointed out by Wenner that "It is now in order to state an ideal toward which designers of clock drives will strive: namely, drives having a constant direct effect on the rate and maintaining a constant amplitude best suited to each individual case. Whether or not the effect of the drive on the rate is zero is immaterial."

This stated ideal is attained in a good embodiment of the present invention.

With reference to the drawing, it is pointed out that the structural form and details have been simplified and arranged for clearness of teaching the invention, rather than for manufacturing details, which can be supplied by those skilled in the art.

Fig. 1 is an end elevation of my invention and shown partly in section, Fig. 2 is a side elevation of Fig. 1 and with certain parts removed for clearness, Fig. 3 is an end elevation of a certain section of Fig. 1, and Figs. 4, 5 and 6 are certain sub-assemblies of Fig. 2.

Referring to Figs. 1 and 2, Fig. 1 is a view of Fig. 2 taken along the dotted line A—B looking east and 1 is a shaft fixed into frame 2, and having a flanged head 3, containing a bearing for one end of the arbor. The frame 2, has a bearing at 5 for the other end of the arbor.

Fig. 2, 6 is a balance wheel, having a hairspring 7, the inner end of which is secured to the arbor 4, by a collet 8. The outer end of the hairspring will be described further on in the disclosure.

Fig. 3 is an end elevation, looking west, of a section of Fig. 2 taken from the dotted line E—F to the dotted line C—D. The certain parts omitted from Fig. 2, referred to above, can now be more clearly pointed out, and they are namely blocks 14 and 18 shown in Fig. 3. These blocks are removed in Fig. 2, in order to show the positions of parts 13 and 17, described later on in the specification in the detailed description of these figures. Fig. 3 shows one form of balance-wheel and hair-spring embodiment of my invention. The rim of the balance-wheel is made in two almost but not quite complete semi-circular arc sections 6 and 9, which are permanent magnets having N and S poles adjacent, as shown in the figure. The air-gaps provided by the discontinuity of the pole pieces 6 and 9, provide magnetic pull toward the air-gaps for magnetizable material as is well understood from the behavior of "horseshoe magnets" so well known to all.

The arbor 4 has a barrel 10 fixed to it, upon which are mounted two bimetallic temperature compensators 11 and 12, which are in turn fixed to the rim segments 6 and 9 in the vicinity of their polar ends, as shown in the figure. These compensators function so that with increased temperature the centers of mass of the rim segments are drawn toward the axis of rotation of the balance and with a decrease in temperature the opposite action takes place. This action provides temperature compensation for the balance over the wide range of temperature changes to which automobile clocks, for instance, are subjected. While the magnetic air-gap is varied a small amount under temperature change, this variation is a small fraction of the total magnetic gap and has no material effect on the pulling power of the magnet under operation of the device. In Fig. 3, 13 is a spring latch, which is fixed at one end to a block 14, attached to frame 2, 15 is a back-stop for latch 13, to prevent latch 13 from striking the rim magnets 6 and 9 when the magnetic force of the magnet pulls on the latch, the operation of which will be discussed later on.

A second spring latch 17, having the same form and dimensions as latch 13, is located behind it and more clearly shown in Fig. 4. Latch 17 is mounted similarly to latch 13, and on a block 18, and is provided with a back-stop 19.

In order to understand the drive for the balance wheel, reference will be had to Figs. 1 and 2. Shaft 1 has mounted upon it a rotatable sleeve 20, having a fixed flange on head 21. Shaft 1 carries a second independent sleeve 22, which has a crank 23, Figs. 2, 3, and 4, fixed to said sleeve 22 and rotates independently of flange 21, on shaft 1.

Flange 21 carries a lug 24, Figs. 2 and 5, and crank 23 carries a lug 25, Figs. 2 and 5. A helical spring 26, Figs. 2 and 5, is loosely coiled around sleeve 22, Figs. 2 and 5, and one end of said spring is fixed to lug 24 and the other end thereof is fixed to lug 25. The unstressed position of helical spring 26 is such that lugs 24 and 25 are held diametrically opposite, so that when flange 21 is rotated in either direction, crank 23 follows its rotation unless impeded from doing so.

Referring back to Figs. 1 and 2, sleeve 20 carries with it an armature 27 and 28 for an electromagnet having coils 29 and 30, and polarized by a permanent magnet 31. While in Fig. 1, the armature 27 and 28 is shown in its neutral position to correspond with the neutral positions of the rotatable elements of Figs. 2 and 3, however, under actual operation of such a magnet, the armature end 27 is held against the pole-piece 32 as shown in Fig. 6, or the end 28 is held against pole-piece 33, depending upon to which pole-piece it was last attracted. Current in coil 29 attracts armature end 27 to pole-piece 32, and current in coil 30 attracts armature end 28 to pole-piece 33, it being understood that there is current in only one coil at a time.

Referring to Figs. 2 and 3, crank 23 carries a lug 34, to which the outer end of hair-spring 7 is fixed.

It will be seen from the structure so far described, when the magnet coils 29 or 39 rotate the sleeve 20 and its attached flange 21, that through the coupling of the helical spring 26, crank 23, when unimpeded, rotates with said armature and drives the balance wheel 6 through its hair-spring connection to lug 34, along with the rotation of said armature.

How this form of balance wheel drive is made to function as a precision time-keeper, will be disclosed with reference to Figs. 4, 5 and 6 in connection with the other figures.

Fig. 4 is a view of the balance wheel stripped down of attached parts to show the operation in the system. Fig. 5 shows the parts essential to a disclosure of operation, and is taken along the dotted line C—D, Fig. 2, looking west and shows the arrangement of the contacts for operating the electromagnet shown again in Fig. 6. All three views in Figs. 4, 5 and 6 are taken looking in the same direction.

Fig. 5, 35 is an insulating support shown also in Fig. 2, and carries two spring contacts 36 and 37, 38 is a second insulating support shown also in Fig. 2, and also carries two spring contacts 39 and 40. The undeflected normal position of both sets of contacts is shown by the illustrated relative positions of contacts 36 and 39, that is undeflected they are both normally open. When lug 25 moves against the spring support of contact 36 it closes contact 36 against contact 39 and holds it closed by pressure of said lug against stop 41, which limits the travel of contact 36, so that the contact thus made may be broken by the movement of lug 24 against the spring of contact 39 and held to a definite open position by pressure against stop 42. Contacts 37 and 40 are operated in an exactly similar manner by oppositely rotated positions of lugs 24 and 25. In the figure, lug 25 has rotated to a position which first closed contacts 37 and 40, and lug 24 has rotated to a position which has opened the contacts first made by lug 25. Contacts 36 and 39 are in their normal position ready for a similar action by lugs 25 and 24.

Fig. 6 shows a battery 43 and a common lead 44, in series with an impulse counter, connected to contacts 39 and 40 of Fig. 5. Fig. 6, lead 45 is connected to both coils 29 and 30. Lead 46 is for operating coil 30 which pulls armature end 28 against pole piece 33, and is connected to contact 36, Fig. 5. Fig. 6, lead 47 is for operating Permanent magnet 31 holds 27 against 32 in by permanent magnet 31, and armature end 28 is 30 is energized, the electromagnetic pull of this coil overcomes the holding effect of 27 against 32 the absence of current in coil 30, however if coil 27 and 28 is rotated counter-clockwise to a piece 32 and into the position shown in the figure. coil 29 which pulls armature end 27 against pole absence of current in coil 29. That is, armature pulled down against 33, and held there, in the and held there by momentary current in coil 30; in other words, the armature 27 and 28 is rocked current in coil 29, and when in this position it stopped position and held there by momentary may be rotated clockwise to a stopped position back and forth by momentary currents alternately in coils 29 and 30.

How this rocking action is made to properly drive the balance, can be best approached by reference to Fig. 4. Latch 13 holds crank 23 in the off center position shown from rotating in a counterclockwise direction and adjustable stop 48 holds the crank from rotating in a clockwise direction. If crank 23 has clockwise torque applied to it by armature 27 and 28, through means of helical spring 26, crank 23 cannot rotate until it is released by latch 13, when the crank will move against stop 49 and latch 17 will spring down and hold the crank in an oppositely off center position. If armature 27 and 28 is then rotated to cause counter-clockwise torque on crank 23, it will remain in its new off center position until released by latch 17, and it will then return to the position shown in the figure and the cycle may be repeated indefinitely, supplying torque to the balance wheel through the hair-spring in first one direction and then in the other, to maintain the oscillations of the balance.

Next it will be shown how latches 13 and 17, are raised to release crank 23, and how this releasing is timed. One of the air-gaps 50 at one set of poles of permanent magnets 6 and 9, which constitute the rim of the balance wheel, passes by latches 13 and 17, which are of magnetizable material, as the balance wheel rotates, and raises both latches against their respective stops 19 and 15 (Fig. 3) and permits crank 23 to be turned in either direction, the direction in which it is turned depends upon the direction of the torque caused by armature 27 and 28. Since lifting effect of air-gap 50 on latches 13 and 17 is present only when the air-gap is very close to the latches, and the duration of this proximity is only momentary, the latches spring back to catch and hold the crank in its rotated position without appreciable delay. The air-gap opposite to 50 is not ordinarily employed other than for poise.

A complete cycle of operation of my timing system can now be traversed.

It is assumed that the system is in operation, and that an instant in the cycle of operation is started from the position of the elements shown in Figs. 4, 5 and 6.

Fig. 4, the balance wheel is at the end of its clockwise arc and is ready to start in a counterclockwise direction shown by the arrow in the figure. Crank 23 has been rotated to its clockwise off center position and is held in this position by stop 48 and latch 13. This clockwise off center position of crank 23 holds lug 25 in the position shown in Fig. 5, which is steadied by stop 51.

Figs. 6 and 5, armature 27 and 28 has been rotated to its counter-clockwise position shown in Fig. 6, and has carried with it lug 24 to its counter-clockwise position steadied by stop 52, Fig. 5; thus causing clockwise torque on lug 25 through spring 26, resulting in a counter-clockwise torque on crank 23 Fig. 4, which is held by latch 13, from turning.

Balance wheel 6 and 9 now starts in its counter-clockwise rotation, and as air-gap 50 passes by latches 13 and 17, the magnetic pull of the poles of the magnetic pieces 6 and 9 raises both latches momentarily and this allows crank 23 to move against stop 49 and be latched there by latch 17, through means of the torque applied to spring 26 by the counter-clockwise rotation of armature 27 and 28.

This movement of crank 23 is in the direction and of the magnitude to supply the losses of the balance wheel system for the amplitude of arc of oscillation employed. As to whether it is an impulse of velocity, an increase of angular displacement, or a combination of both depends upon the constants of the structure and the timing of the release of the latches.

Referring to Fig. 5, as crank 23 is released, its lug 25 moves against the spring of contact 36 and closes it against contact 39, which causes current to flow through coil 30 (and through the impulse counter shown) which rotates armature 27 and 28 to its clockwise position and is held there by magnet 31. As armature 27 and 28 rotates, it carries with it lug 24, Fig. 5, which moves against the spring of contact 39, and opens the circuit of coil 30, at the end of its travel, and leaves contacts 36 and 39 open and in a position corresponding to that shown in the figure for 37 and 40. This operation causes clockwise torque to be applied to crank 23, and the system is thus set for the reverse operation when the balance starts upon its clockwise trip, as will be fully understood by those skilled in the art of balance wheel drives.

An understanding of the disclosure by those skilled in the art will reveal:

That the total force (above a critical value) in the primary drive is not transmitted to the balance wheel.

That the force (above a critical value) is constant and independent of the primary power (battery or otherwise) so long as the driving spring 26 has a constant elasticity. This spring having very little deflection can be made of a material having a very low coefficient of elasticity change with temperature, such as some of the nickel alloys, or it can be made of a bimetallic combination to compensate for temperature changes, when extreme accuracy of timing is required; however, good spring steel in spring 26 gives performance in timing greatly improved over prior art impulse drives.

That the driving force caused upon the balance wheel is dependent upon the strength of spring 26 and the angular rotation of lug 25, and above the power required to move lug 24 from one stop to the other, the force upon lug 24 has no driving effect upon the balance wheel.

That the intermediate mechanism shown in Fig. 5 is disclosed as a specific embodiment of a generic invention which may be employed between the drive and balance-wheel system of any suitable balance wheel timing system.

That the force applied to the operation contacts is not taken from the balance system, and a large amount of power is available for operating comparatively heavy wiping contacts, which eliminates contact failures.

The balance-wheel is entirely mechanically free, and the only mechanical connection with it is one end of the hair-spring which is obviously necessary to its operation.

The only mechanism-operating energy that is taken from the balance-wheel is that required to lift the latches 13 and 17 through the magnetic pull on these, and the loss of energy to perform this function is absolutely constant under all conditions of operation including temperature changes. These minute losses (due to magnetic hysteresis and eddy currents in the latches) are dependent upon the intensity of the magnetic field in the latches and the angular velocity of the balance-wheel and are of a definite fixed value. Variation in the friction of the latches calling for variation in the force required to raise them, is eliminated by providing adequate magnetic pulling force to take care of the greatest mechanical friction to be encountered, then the excess force to make up the constant quantity available is taken up by the latch stops 15 and 19.

That the rate of going may be adjusted by adjusting the driving force limited by the driving force stabilizer, which can be done conveniently by angular adjustment of stops 48 and 49.

That the form of the magnets on the balance-wheel is not a limitation of the invention, and any suitable form of magnet may be mounted as a part of the balance-wheel, to substitute for the form of magnet shown in the figures.

That other and further modifications and embodiments may be made without departing from the spirit of the invention.

What I claim is:

1. In a time-keeping mechanism, a journaled balance-wheel and cooperating hair-spring providing timing for said mechanism, a source of driving impulses for said balance-wheel subject to variation, and a mechanical impulse stabilizer including a balance wheel operated impulse release mechanism having a power demand on the balance-wheel-system which is substantially free of mechanical shock, said stabilizer being interposed between said source and said balance-wheel causing stabilization of the impulses transmitted to said balance-wheel.

2. In a time-keeping mechanism, a journaled balance-wheel and cooperating hair-spring providing timing for said mechanism, a source of driving impulses for said balance-wheel subject to variation, and an impulse transmission device interposed between said source and said balance-wheel comprising a weight operated between stops under spring propulsion, whereby the amount of energy transmitted to said balance-wheel is limited by said weight, spring and stops above the minimum energy required to drive said balance-wheel under timing operation and substantially free of balance-wheel power-transmission shock.

3. In a time-keeping mechanism, a journaled balance-wheel and cooperating hair-spring providing timing for said mechanism, a primary impulse generator subject to power output variation in response to power input variation, a secondary impulse generator under actuation by said primary impulse generator and providing output power substantially non-responsive to variation in said actuation above the minimum power required to drive said balance-wheel under timing operation, said balance-wheel being actuated by the output power of said secondary impulse generator and said secondary impulse generator having a balance-wheel-operated impulse-release having a substantially shock-free coupling between said impulse generator and said balance-wheel.

4. In a time-keeping mechanism, a journaled balance-wheel and cooperating hair-spring providing timing for said mechanism, a cockable spring-driven hammer to drive said balance-wheel and having a trigger release, powered means to cock said hammer, and a trigger actuating means motivated by said balance-wheel.

5. In a balance-wheel-hair-spring timing system, a drive for said system providing energy impulses, latch checking and releasing means which control the energy impulses for the drive, and magnetic means included in the mass of said balance-wheel causing said checking and releasing at times determined by the rotation of said balance-wheel.

6. In a balance-wheel-hair-spring timing system, a drive for said system providing energy impulses, latch checking and releasing means which control the energy impulses for the drive, and a magnet rotating with said balance-wheel causing said checking and releasing.

7. In an electrically impulsed drive organization for a balance-wheel-hair-spring timing system, a source of electric power, an electromagnet generating mechanical impulses driving said timing system, electrical contacts causing actuation of said electromagnet by power from said source at instants determined by said timing system, and a contact actuating means driven directly by energy taken directly from said electromagnet and without taking any energy from said balance-wheel operation.

8. The method of actuating contacts in an electrically impulsed drive organization for a balance-wheel-hair-spring timing system having contacts causing actuation of said drive by power from an electrical source which comprises transmitting energy from said source to said system through said organization and deriving actuating energy for said contacts from said organization before said energy reaches said system, whereby the contact actuating energy is not subtracted from said timing system.

MONTFORD MORRISON.

References Cited in the file of this patent

UNITED STATES PATENTS

| Number | Name | Date |
| --- | --- | --- |
| 278,173 | Osgood | May 22, 1883 |
| 1,772,555 | Poole | Aug. 12, 1930 |
| 1,772,556 | Poole | Aug. 12, 1930 |
| 1,970,412 | Bates | Aug. 14, 1934 |
| 2,292,244 | Smith | Aug. 4, 1942 |
| 2,459,930 | Fink | Jan. 25, 1949 |

FOREIGN PATENTS

| Number | Country | Date |
| --- | --- | --- |
| 682,134 | Germany | Oct. 9, 1939 |
| 705,966 | Germany | May 14, 1941 |